(12) United States Patent
Lisenker et al.

(10) Patent No.: US 6,279,700 B1
(45) Date of Patent: Aug. 28, 2001

(54) MAGNETORHEOLOGICAL FLUID DAMPER

(75) Inventors: Ilya Lisenker, Miamisburg; Patrick Neil Hopkins, West Carrollton; Thomas Allen Baudendistel, Farmersville; Michael Leslie Oliver, Xenia, all of OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/395,070

(22) Filed: Sep. 13, 1999

(51) Int. Cl.[7] ............................................. F16F 9/06
(52) U.S. Cl. ............................. 188/267.1; 188/322.15
(58) Field of Search ........................ 188/267.1, 267.2, 188/322.15

(56) References Cited

U.S. PATENT DOCUMENTS

| 2,661,596 | 12/1953 | Winslow . | |
|---|---|---|---|
| 3,207,269 | 9/1965 | Klass . | |
| 5,277,281 | 1/1994 | Carlson et al. . | |
| 5,632,361 | 5/1997 | Wulff et al. . | |
| 5,878,851 | * | 3/1999 | Carlson et al. ................. 188/322.15 |
| 6,019,201 | * | 2/2000 | Gordaninejad et al. ........ 188/322.15 |

FOREIGN PATENT DOCUMENTS

| 404175534 | * | 6/1992 | (JP) .................................. 188/267.1 |
| 98/00653 | | 1/1998 | (WO) . |

* cited by examiner

*Primary Examiner*—Matthew C. Graham
(74) *Attorney, Agent, or Firm*—Robert M. Sigler

(57) ABSTRACT

A magnetorheological fluid damper is provided which permits effective control of damping while minimizing assembly size and costs by including a thin-walled insert in a flow gap formed between a flux ring and a piston body. The insert may include a thin-walled tubular insert having a generally smooth cylindrical shape for increasing the shear surface area. Alternatively, a corrugated insert may be provided having corrugations formed by edges extending axially along the insert. The corrugations may be formed in a variety of locations, sizes, shapes and spacings along the axial extent of the insert and the circumference of the insert. The corrugations advantageously effectively align the insert within the flow gap and also function to securely connect the flux ring to the piston body without the use of other devices such as plates thereby reducing the size and cost of the assembly.

18 Claims, 7 Drawing Sheets

MAGNETORHEOLOGICAL FLUID DAMPER

TECHNICAL FIELD

The present invention relates to a magnetorheological fluid damper and more particularly, to a linear acting fluid damper for a vehicle suspension employing magnetic tuning in connection with a magnetorheological working fluid to effect desired damping levels.

BACKGROUND OF THE INVENTION

Magnetorheological fluids that comprise suspensions of magnetic particles such as iron or iron alloys in a fluid medium are well known. The flow characteristics of these fluids can change by several orders of magnitude within milliseconds when subjected to a suitable magnetic field due to suspension of the particles. The ferromagnetic particles remain suspended under the influence of magnetic fields and applied forces. Such magnetorheological fluids have been found to have desirable electro-magnetomechanical interactive properties for advantageous use in a variety of magnetorheological (MR) damping devices, such as rotary devices including brakes and clutches, and linear-acting devices for damping linear motion or for providing controllable dissipative forces along the damper's axis.

In particular, linear acting MR dampers have been suggested for suspension systems, such as a vehicle suspension system and vehicle engine mounts. PCT patent application 10840, published Jan. 8, 1998 (the '840 application), discloses a conventional linear acting controllable vibration damper apparatus which includes a piston positioned in a magnetorheological fluid-filled chamber to form upper and lower chambers. The piston includes a coil assembly, a core, i.e. pole pieces, and an annular ring element positioned around the pole pieces to form an annular flow passage for permitting flow of the magnetorheological fluid between the chambers. When the piston is displaced, magnetorheological fluid is forced through the annular flow passage. When the coil is energized, a magnetic field permeates the channel and excites a transformation of the magnetorheological fluid to a state that exhibits damping forces.

Although the damper disclosed in the '840 application may perform adequately, there is a continuing need for a more compact, higher performance and/or lower cost damper. For example, the damper of the '840 application requires a piston having an unnecessarily long length to form a sufficient surface area in the annular passage against which adequate shear can be generated to permit effective damping control.

In damper designs utilizing an annular flow passage, the radial width of the annular flow passage must be precisely set and maintained along the axial length of the passage throughout operation to ensure optimum, predictable control of the damping performance. The '840 application discloses the use of a plurality of bridge elements interconnecting the pole piece and the annular ring element. The bridge elements may include circumferentially spaced welds formed of nonmagnetic material. Also, each bridge may include a nonmagnetic pin to further locate and retain the pole relative to the ring. In another embodiment, the pole and ring are connected using a nonmagnetic plate positioned at one end of the assembly. The plate includes radially extending tabs forming bridging elements positioned outside the annular passage and extending across the inlet/outlet to the annular passage. The plate is secured to the pole piece and the ring by spot welds.

However, the means for connecting the ring and pole piece of the damper disclosed in the '840 application may result in specific disadvantages. For example, the welds, pins and radial tabs of the plate each include blunt surfaces exposed to the fluid flow that undesirably impede the flow and increase uncontrollable drag forces which lead to a reduction in turn-up ratio performance of the assembly. Also, the plate adds to the length of the piston thereby resulting in an undesirably large and costly assembly possibly incapable of meeting the packaging constraints of a particular application.

Therefore, there is a need for a more compact, less costly MR damper capable of effectively and controllably damping motion.

SUMMARY OF THE INVENTION

It is an object of the present invention, therefore, to overcome the disadvantages of the prior art and to provide a magnetorheological (MR) fluid damper capable of effectively and predictably providing a desired damping effect.

It is another object of the present invention to provide an MR damper having a piston with a minimal length while achieving effective damping.

It is yet another object of the present invention to provide an MR damper which optimizes the surface area along a flow gap formed by the piston thereby enhancing a shearing effect.

It is a further object of the present invention to provide an MR damper which increases shear in an annular flow gap without significantly impeding both fluid flow axially through the gap and a magnetic flux transversely across the gap.

Yet another object of the present invention is to provide an MR damper which effectively and accurately locates a flux ring concentrically on a central piston core to form and maintain an annular flow gap.

It is a still further object of the present invention to provide an MR damper including a flux ring which is simply and inexpensively attached to a piston core.

Still another object of the present invention is to provide an MR damper offering sufficient flexibility to accommodate damper piston to tube misalignment thereby allowing looser manufacturing tolerances.

Yet another object of the present invention is to provide an MR damper which permits a smaller clearance between the damper piston outside diameter and the damper cylinder resulting in less uncontrolled leakage around the piston.

A still further object of the present invention is to provide an MR damper capable of better distributing side loads on the piston thereby lowering wear rates on the piston and the damper cylinder possibly permitting the use of softer and less expensive materials while reducing the plating thickness on the inner surface of the cylinder.

It is yet another object of the present invention to provide an MR damper which avoids the use of mounting plates positioned at the end of the piston for securing a flux ring to the piston core thereby eliminating very costly machined parts.

These and other objects are achieved by providing a damper comprising a cylinder containing a magnetorheological fluid and a piston mounted for reciprocal movement in the cylinder to form a first chamber positioned on one side of the piston and a second chamber positioned on an opposite side of the piston. The piston includes a flow gap extending between the first and the second chambers. The damper also includes a magnet assembly mounted on the piston to generate a magnetic field extending through the flow gap. The damper also includes at least one thin-walled insert positioned in the flow gap to form a first flow gap section on one side of the thin-walled insert and a second flow gap section on an opposite side of the thin-walled insert. The thin-walled insert includes a first surface facing the first flow gap section to generate shear stress on the magnetorheological fluid flowing through the first flow gap section and a second surface facing the second flow gap section to generate shear stress on the magnetorheological fluid flowing through the second flow gap section. The thin-walled insert may be formed of a nonmagnetic material so as not to interfere with the magnetic flux. Also, the thin-walled insert may have a tubular shape to form a flow gap extending annularly around an axis of the piston. The damper may also include at least one end plate mounted on the piston to secure the thin-walled insert against axial and radial movement in the flow gap. The thin-walled insert may include two annular opposing unconnected ends facing one another to form an end gap. The thin-walled insert also may include a thickness extending between the first and second surfaces which is less than a total radial width equal to the sum of a width of both the first and second flow gap sections. The thin-walled insert may comprise two inserts positioned a spaced axial distance apart.

The MR damper of the present invention may be in the form of a thin-walled insert including corrugations. The corrugations may form edges extending axially along the piston and contacting at least one of the piston and the magnet assembly to radially align the insert in the flow gap. The corrugated insert is preferably formed of a nonmagnetic material. In one embodiment, the corrugated insert may include a middle annular corrugated section including the corrugations, a first annular non-corrugated section positioned axially on one side of the middle annular corrugated section and a second annular non-corrugated section positioned axially on an opposite side of the middle annular corrugated section. In yet another embodiment the thin-walled insert may include a middle annular non-corrugated section, a first annular corrugated section positioned axially on one side of the middle annular non-corrugated section and a second annular corrugated section positioned axially on an opposite side of the middle annular non-corrugated section. The axial edges may be fixedly secured to at least one of the piston and the magnetic assembly by at least one of a welded joint and a soldered joint which will be positioned in the flow gap. The magnet assembly of the damper may include at least one flux pole piece positioned radially on one side of the flow gap and a flux ring positioned radially on an opposite side of the flow gap. The corrugated insert may be adapted to secure the flux ring and the pole piece against relative axial and radial movement. The thin-walled corrugated insert may also include a plurality of tabs extending outside the flow gap and connected to the flux ring and the pole piece.

BRIEF DESCRIPTION OF THE DRAWINGS

FIG. 1a is an exploded view of the piston assembly of the damper of the present invention;

FIG. 1b is an end view of the piston assembly of FIG. 1a;

FIG. 1c is a cross sectional view of the damper of the present invention including the piston assembly mounted in a cylinder;

FIG. 1d is an expanded view of the area A of FIG. 1b;

FIG. 2a is an exploded perspective view of a second embodiment of the piston assembly of the present invention;

FIG. 2b is an end view of the piston assembly of FIG. 2a;

FIG. 2c is a cross sectional view of the piston assembly of the present invention taken along plane 2—2 in FIG. 2b;

FIG. 2d is an expanded view of the area B in FIG. 2b;

FIG. 3a is an exploded perspective view of a third embodiment of the piston assembly of the damper of the present invention;

FIG. 3b is an end view of the piston assembly of FIG. 3a;

FIG. 3c is a cross sectional view of the piston assembly of FIG. 3b taken along plane 3—3;

FIG. 3d is an expanded view of the area C in FIG. 3b;

FIG. 4a is an exploded perspective view of a fourth embodiment of the piston assembly of the damper of the present invention;

FIG. 4b is an end view of the piston assembly of FIG. 4a;

FIG. 4c is a cross sectional view of the piston assembly of FIG. 4b taken along plane 4—4;

FIG. 4d is an expanded view of the area D in FIG. 4b;

FIG. 5b is an end view of the piston assembly of FIG. 5a;

FIG. 6a is an exploded perspective view of a piston assembly containing a sixth embodiment of the insert of the present invention;

FIG. 6b is an end view of the piston assembly of FIG. 6a;

FIG. 6c is an expanded view of the area F in FIG. 6b;

FIG. 8a is an exploded perspective view of a piston assembly containing an eighth embodiment of the insert of the present invention;

FIG. 8b is an end view of the piston assembly of FIG. 8a;

FIG. 8c is a cross sectional view of the piston assembly taken along plane 8—8 in FIG. 8b; and FIG. 8d is an expanded view of the area G of FIG. 8b.

DESCRIPTION OF THE PREFERRED EMBODIMENT

Figures 1A, 1B, 1C, 1D:
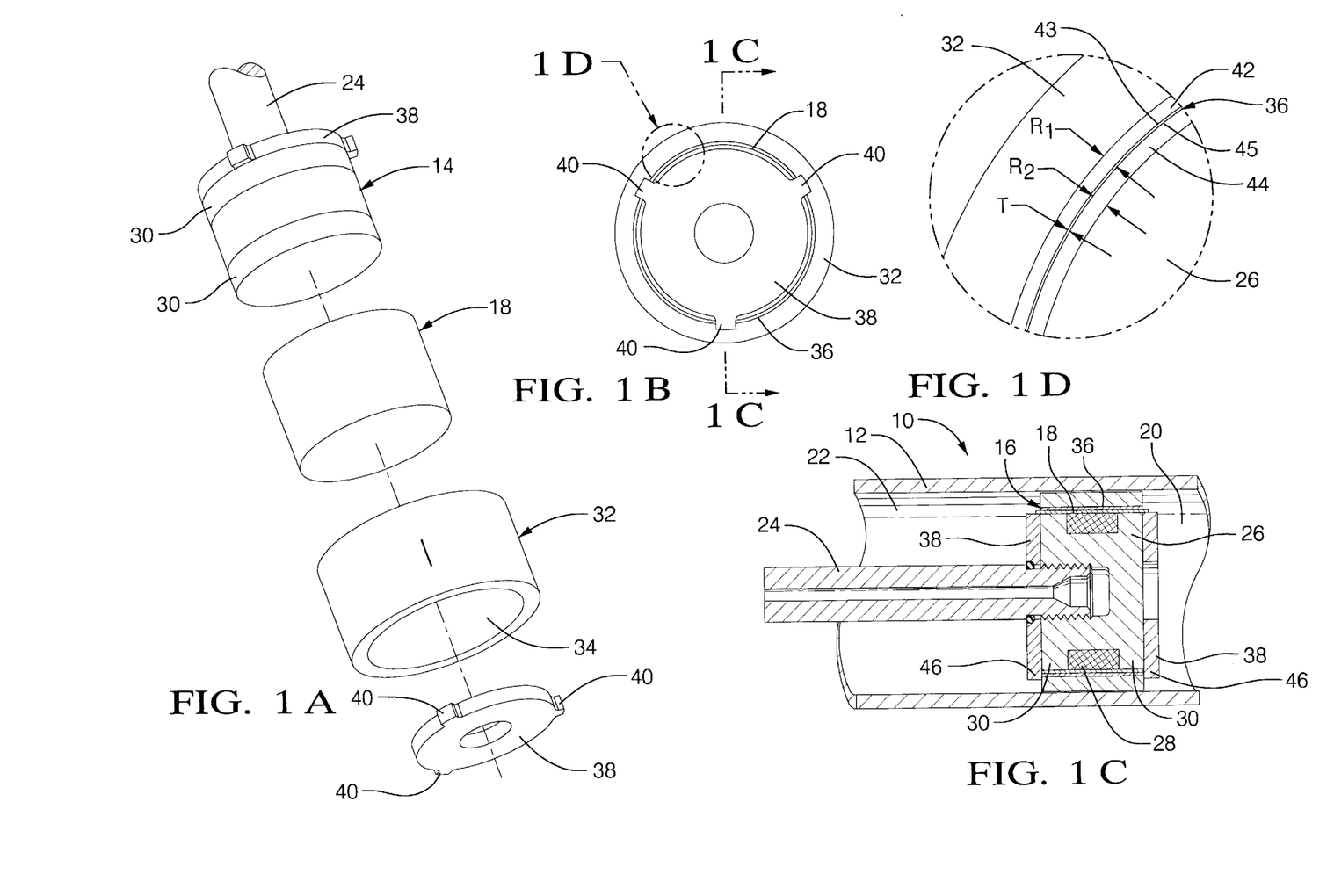

Referring to FIGS. 1a–1c, there is shown the magnetorheological fluid damper of the present invention indicated generally at 10, designed to effectively minimize manufacturing costs and damper size while effectively damping linear motion. The damper 10 includes a cylinder 12 containing magnetorheological fluid, a piston 14 mounted for reciprocal movement in cylinder 12, a magnet assembly 16 mounted on piston 14 to generate a magnetic field and a thin-walled insert 18 positioned and designed to optimize damper operation.

Referring to FIG. 1c, piston 14 divides cylinder 12 into a first chamber 20 positioned on one side of piston 14 and a second chamber 22 positioned within the cylinder 12 on an opposite side of piston 14. Piston 14 includes a cylindrical rod 24 and a piston body 26 mounted on one end of rod 24 and formed of a magnetic material. Magnet assembly 16 includes a coil 28 mounted on piston body 26 to form flux pole pieces 30 positioned on each axial side of coil 28. Coil 28 is connected to an electrical source (not shown) via leads extending through rod 24. Magnet assembly 16 also includes an annular flux ring 32 containing a central bore 34 for receiving piston 14. As shown in FIG. 1c, flux ring 32 is positioned around piston 14 to form an annular flow gap 36 between the inner annular surface of flux ring 32 and the outer surface of piston 14.

Damper 10 further includes end plates 38 positioned on each axial end of piston body 26 for securing flux ring 32 to piston body 26. Flux ring 32 must be effectively secured against movement relative to piston body 26 so as to precisely form and maintain a desired radial width or thickness of flow gap 36 thereby providing predictable control of the damping effect. Each end plate 38 includes several radial extensions 40 angularly spaced around the circumference of end plate 38 for connection to flux ring 32. The outer diameter of end plates 38 is no greater than the outer diameter of piston body 26, except for the flow areas covered by radial extensions 40, to permit substantially unimpeded flow of magnetorheological fluid through flow gap 36. End plates 38 may be connected to piston body 26 and flux ring 32 by any conventional means, such as threaded fasteners or welding.

Fundamentally, during damping, magnetorheological fluid present in one of the chambers of cylinder 12 flows through flow gap 36 from, for example, first chamber 20 to second chamber 22 as piston 14 moves to the right as shown in FIG. 1c. Flux ring 32 is designed with an outer diameter sized to form a sliding fluid seal with the inner surface of cylinder 12 so as to permit relative sliding movement while avoiding significant leakage at the interface. The magnetorheological fluid may be any conventional fluid including magnetic particles such as iron or iron alloys which can be controllably suspended within the fluid by controlling a magnetic field thereby varying the flow characteristics of the fluid through flow gap 36. The electrical current to coil 28 is varied to vary the magnetic field thereby controlling the flow characteristics of the magnetorheological fluid to achieve a desired damping effect for a given application.

Importantly, damper 10 of the present invention also includes the thin-walled insert 18 having a generally cylindrical or tubular shape for positioning within flow gap 36. Thin-walled insert 18 is formed of a nonmagnetic material so as not to interfere with the magnetic flux extending across flow gap 36. The term nonmagnetic includes both nonmagnetic materials having a relative permeability of approximately one or slightly ferromagnetic materials having a low permeability which saturate easily and thus have no significant adverse effect on the magnetic flux. Thin-walled insert 18 is positioned in flow gap 36 to form a first flow gap section 42 between a first surface 43 of insert 18 and flux ring 32 and a second flow gap section 44 positioned between a second surface 45 of insert 18 and the outer surface of piston 14. Of course, it is critical that thin-walled insert 18 be held in a fixed position so as to maintain the predetermined desired width of each flow gap section 42, 44. In the present embodiment, thin-walled insert 18 is fixed against axial and radial movement by end plates 38. Each radial extension 40 of end plates 38 includes a curvilinear groove 46 for receiving the edge of thin-walled insert 18. Insert 18 is formed with an axial length greater than piston body 26 so as to extend in an overlapping manner with end plates 38 thereby permitting engagement in grooves 46. However, any other securing means for effectively positioning insert 18 in flow gap 36 in a manner to prevent movement of insert 18 throughout operation could be used.

As shown in FIG. 1d, importantly, thin-walled insert 18 includes a thickness t of a minimal size so as not to significantly interfere with or adversely impede the flow of fluid axially through flow gap 36 nor the magnetic flux. For example, the thickness t of an insert may be less than a total radial width T equal to the sum of the radial width $R_1$ of first flow gap section 42 and the radial width $R_2$ of second flow gap section 44. Preferably, as in the present embodiment, the thickness t of insert 18 is less than the radial width of at least one of the first and second flow gap sections 42, 44. Specifically, for example, the thickness t of insert 18 is approximately equal to or less than 0.25 mm. This insert is then positioned in a flow gap 36 having a total radial width in the range of approximately 0.5 mm–2 mm prior to the insertion of insert 18.

Thus, thin-walled insert 18 of the present invention effectively creates two additional cylindrical surfaces extending through flow gap 36 against which shear can be generated as fluid flows through gap sections 42 and 44. Consequently, a shorter piston can be designed having a smaller axial length while obtaining the equivalent shearing effect and damping control as a longer piston. This reduction in piston length results in substantial cost savings and a reduction in the assembly package size and weight.

Figures 2A, 2B, 2C, 2D:
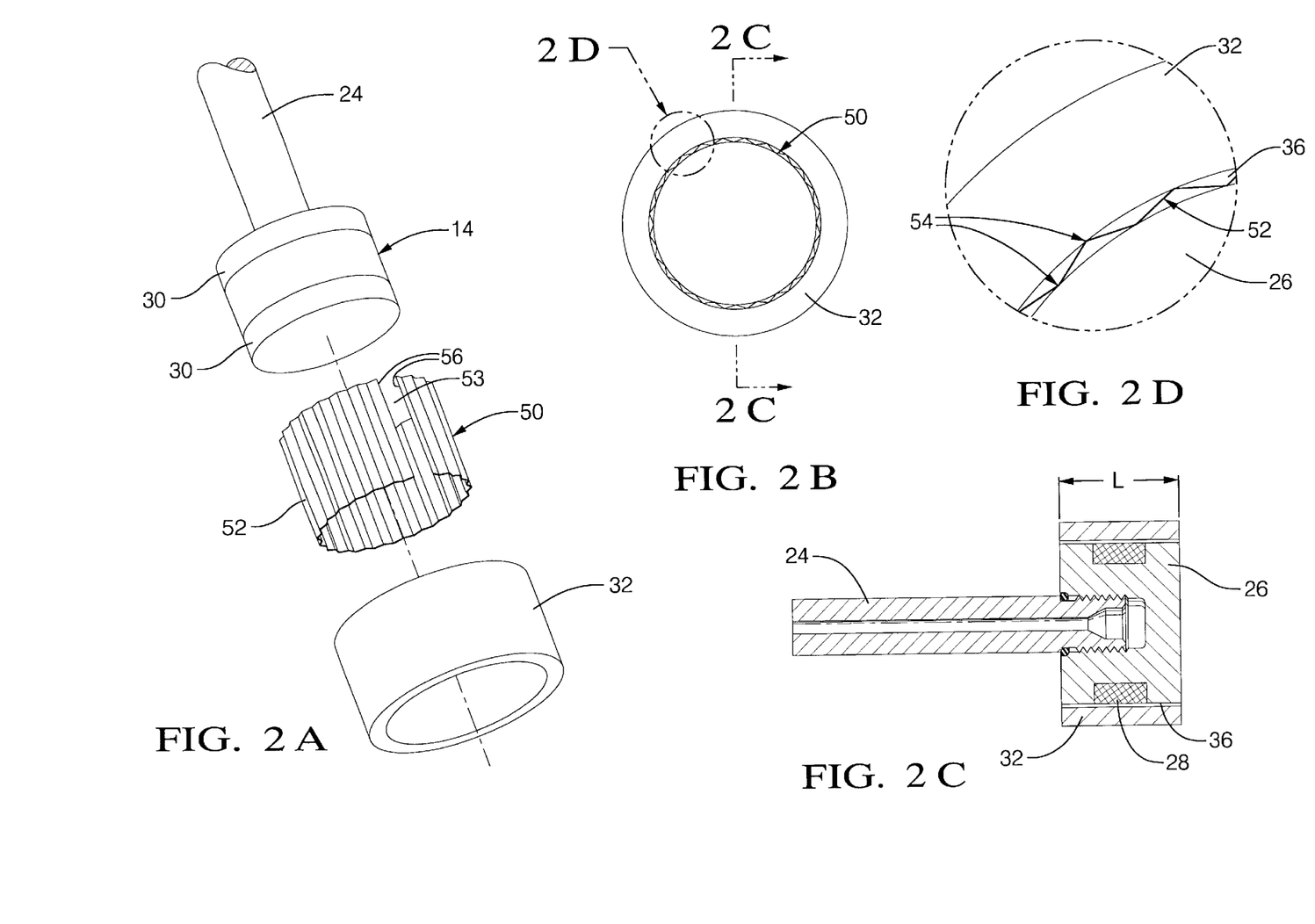
Figures 3A, 3B, 3C, 3D:
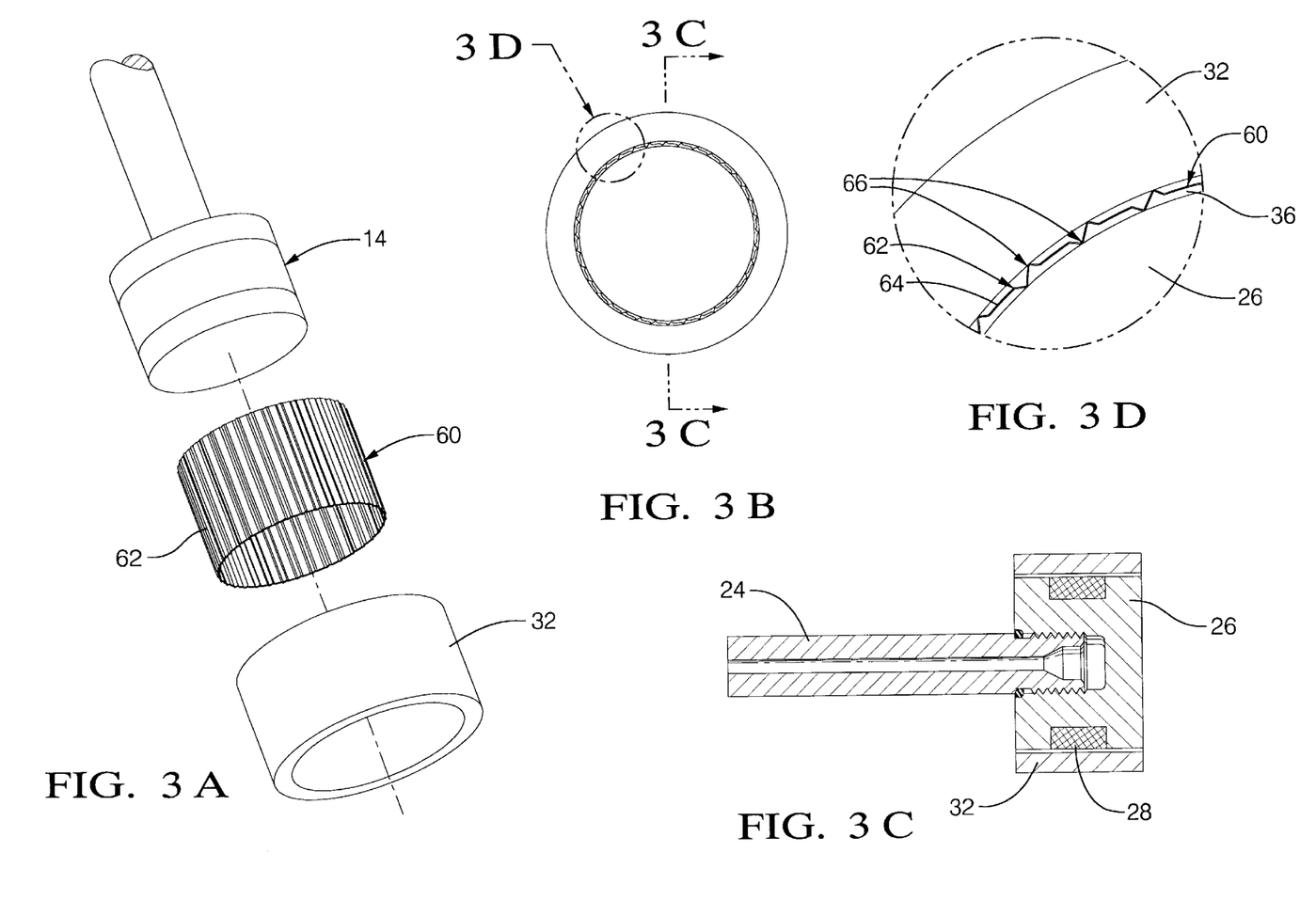
Figures 4A, 4B, 4C, 4D:
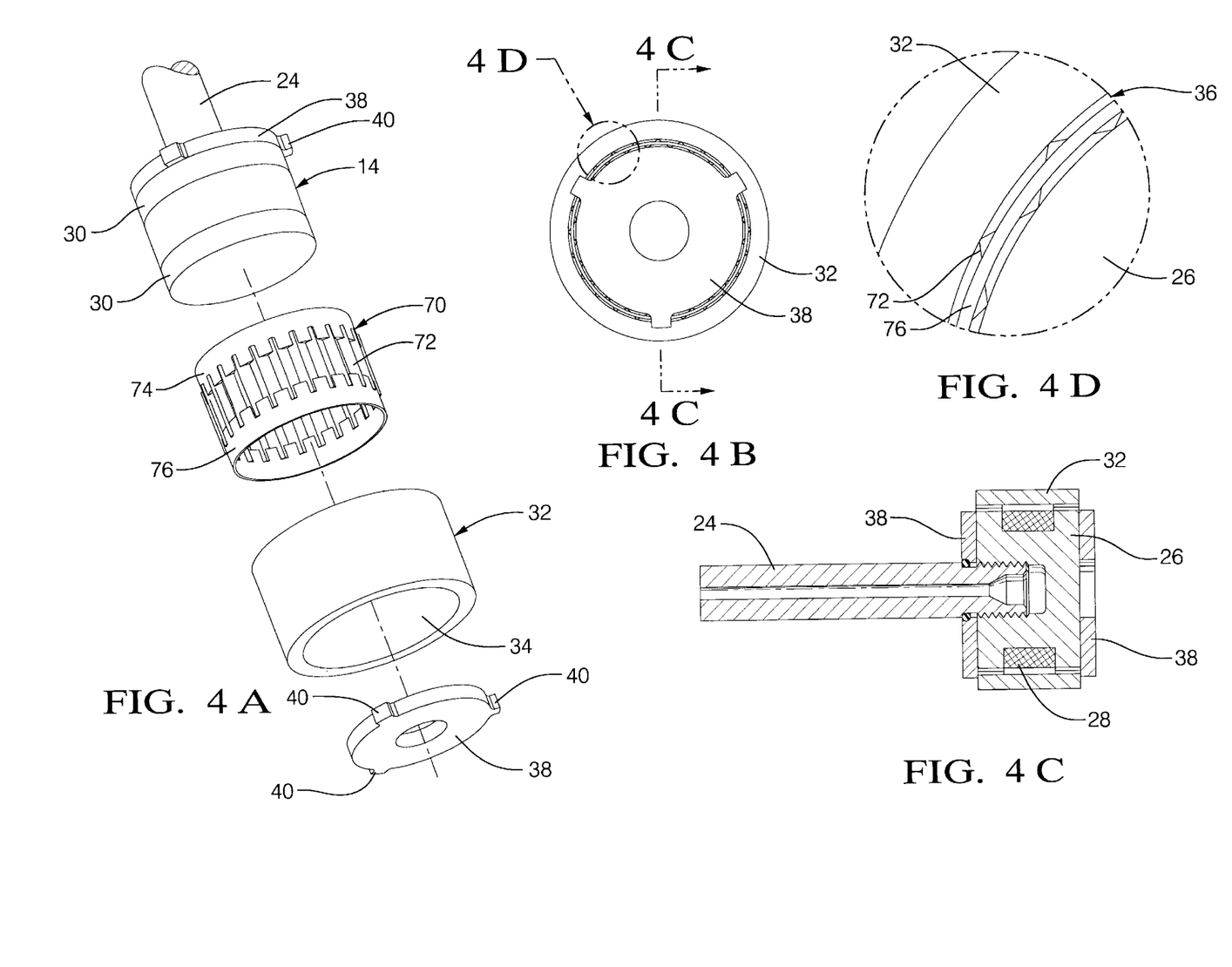
Figure 5A:
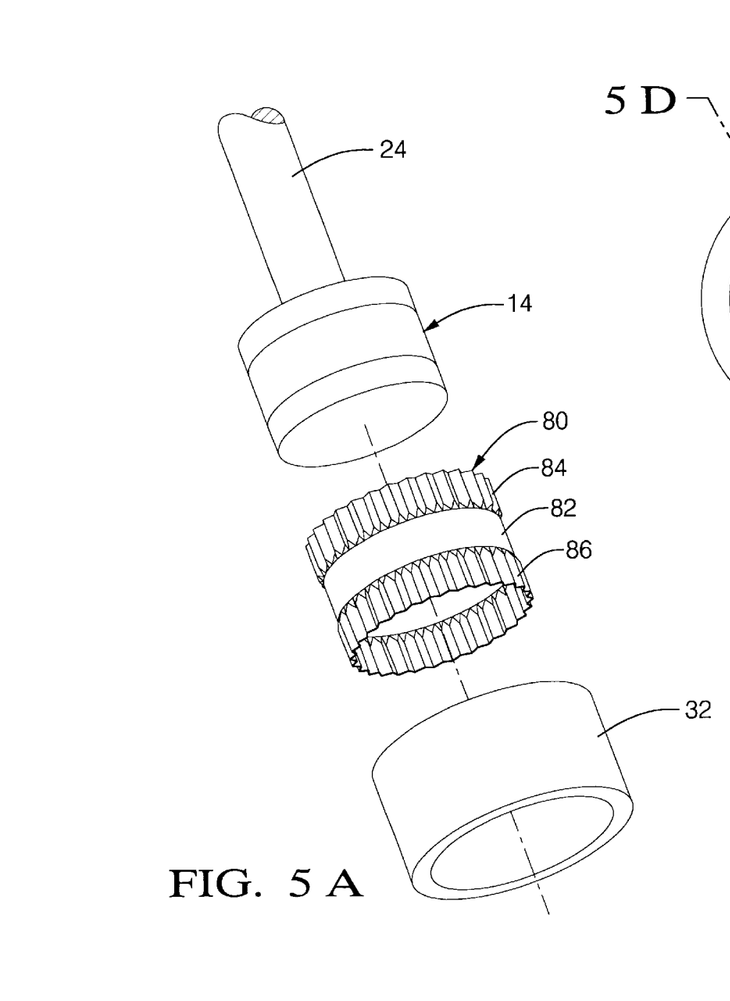
FIG. 5a is an exploded perspective view of a fifth embodiment of the piston assembly of the damper of the present invention.
Figure 5C:
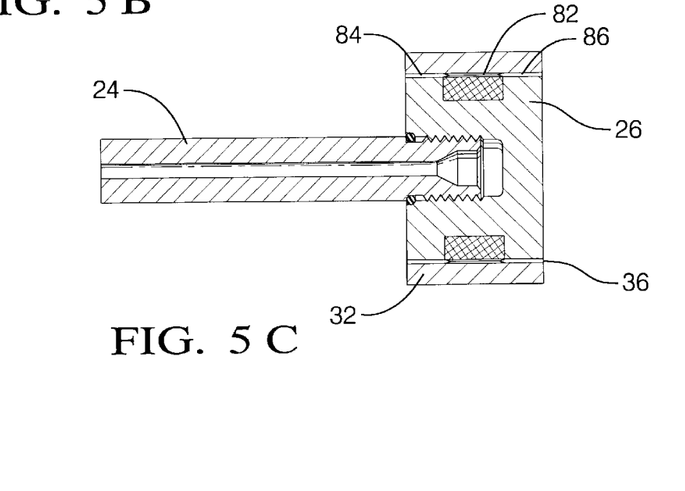
FIG. 5c is a cross sectional view of the piston assembly of FIG. 5b taken along plane 5—5.
Figure 5D:
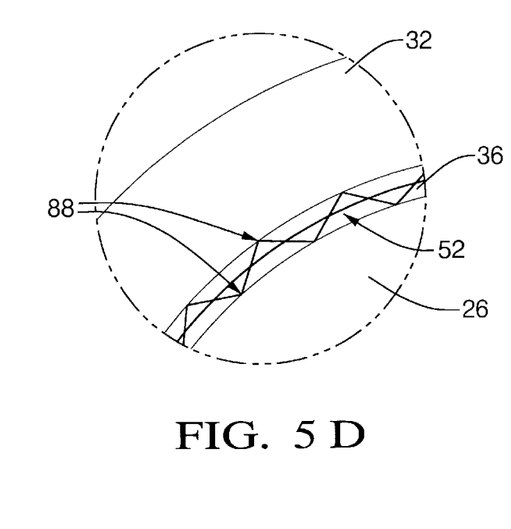
FIG. 5d is an expanded view of the area E in FIG. 5b.

Referring to FIGS. 2a–2d, a second embodiment of the damper of the present invention is shown which utilizes a preferred type of insert to achieve additional advantages. As shown in FIG. 2a, a corrugated insert 50 is provided having corrugations 52 extending axially along the insert. Although two end plates may be used to secure flux ring 32 and corrugated insert 50 to piston 14, in the present embodiment, corrugated insert 50 is preferably advantageously used to securely connect flux ring 32 to piston 14 while necessarily also securely positioning corrugated insert 50 in flow gap 36. For example, axial edges 54 may be secured to flux ring 32 and piston 14 by any conventional process, such as welding, soldering or brazing. One method of retaining the corrugated insert 50 could be by pre-tinning the axial edges or crests of the corrugations and soldering the parts together, perhaps by passing current between flux ring 32 and piston body or core 26. Alternatively, connection of the corrugated insert 50 to the other components may be achieved by resistance welding the corrugations 52 to piston body 26 and soldering flux ring 32 to corrugations 52 by induction heating of flux ring 32. In this case, a flow of cold gas may be established in the flow gap in order to prevent over heating of coil 28. Alternatively, corrugated insert 50 may be connected to piston body 26 and flux ring 32 by a suitable adhesive. Without the use of end plates, the corrugated insert 50 need not have a length extending beyond the length of piston body 26. Thus, the corrugations function to connect the components of the piston assembly while aligning the corrugated insert 50 in flow gap 36. By avoiding the use of the end plates, the present embodiment substantially reduces piston length L (FIG. 2c) and eliminates very costly machined stainless steel parts. The corrugations 52 also result in greater insert stiffness thereby preventing flutter at high flow velocities. The corrugated insert 50 is preferably formed of a nonmagnetic material in order to prevent the magnetic flux from following the corrugations instead of the magnetorheological fluid. Of course, end plates may be used with corrugated insert 50 and axial edges 54 also secured to the opposing surface to provide greater stiffness depending on the particular application. Due to corrugations 52, corrugated insert 50 provides increased flexibility to accommodate possible piston and cylinder misalignment thereby allowing looser manufacturing tolerances. In addition, corrugated insert 50 permits a smaller clearance between the piston outer diameter and the inner diameter of cylinder 12 resulting in less uncontrolled leakage around the piston as well as better distribution of side loads and, therefore, lower wear rates on both the piston and the cylinder. As a result, this design may permit the use of softer and less expensive materials. Also, the thickness of the plating typically applied to the inner diameter surface of cylinder 12 may be reduced thereby lowering costs.

In the embodiment of FIGS. 2a–2d, corrugated insert 50 is formed from a strip of sheet metal corrugated and formed into a cylinder having opposing ends 56. Opposing ends 56 may either be connected or a small end gap 53 maintained as shown in FIG. 2a without affecting structural or damping performance.

The corrugations of the corrugated insert of the present invention may be formed in a variety of sizes, shapes and spacings. For example, FIGS. 3a–3d disclose a damper similar to that of the previous embodiments except that a corrugated insert 60 is provided with corrugations 62 spaced a significant circumferential distance by relatively flat sections 64. Again, the edges 66 may be connected to flux ring 32 and piston body 26 by any conventional means, such as welding, soldering or brazing. This embodiment optimally provides the low flow restriction benefits of the insert embodiment of FIGS. 1a–1d while also utilizing the aligning features of the corrugated insert embodiment of FIGS. 2a–2d in securely aligning and positioning insert 60 within flow gap 36 while securing flux ring 32 to piston body 26. This embodiment may also be beneficial in offering an insert stiffness between the stiffness levels experienced in the two previous embodiments.

FIGS. 4a–4d illustrate a fourth embodiment of the damper and insert of the present invention including an insert 70 including a middle annular corrugated section 72, a first annular non-corrugated section 74 connected or formed on one axial side of middle annular corrugated section 72 and a second annular non-corrugated section 76 connected or formed on an opposite axial side of middle annular corrugated section 72. The middle annular corrugated section 72 is formed of a nonmagnetic material and functions to provide stiffness and support to the assembly. First and second annular non-corrugated section 74 and 76 are formed of two highly permeable pieces of tube and positioned in respective flux paths. This design advantageously avoids any adverse effects of corrugations on the flux extending through flow gap 36 by restricting the corrugations to the portion of the flow gap positioned adjacent coil 28. Insert 70 may be connected using end plates 38.

Now referring to FIGS. 5a–5d, a fifth embodiment of the damper and insert of the present invention is shown which includes a thin-walled insert 80 having a middle annular non-corrugated section 82, a first corrugated section 84 formed or connected to one axial side of middle annular non-corrugated section 82 and a second corrugated section 86 formed or connected to an opposite axial side of middle annular non-corrugated section 82. This design positions middle annular non-corrugated section 82 adjacent coil 28 thereby lowering the corrugated surface area of the insert thus offering both lower surface area and lower flow restriction in the area of the coil 28. First and second corrugated sections 84 and 86 can then be used to align and secure insert 80 within flow gap 36 while also fixedly connecting flux ring 32 to piston body 26 without the use of end plates. Of course, axial edges 88 of the corrugations may be connected to the adjacent components by any of the methods discussed hereinabove or any other conventional method sufficient to create a secure connection.

Figures 6A, 6B, 6C:
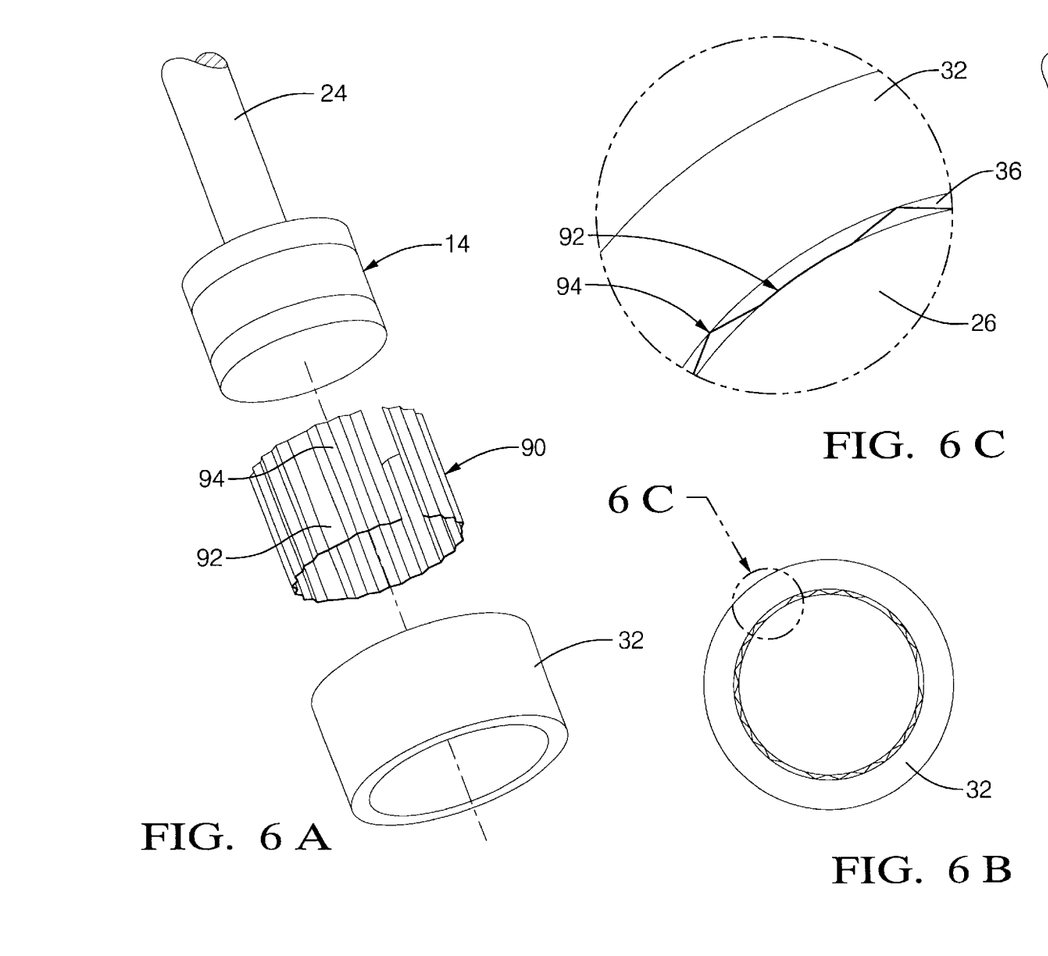

FIGS. 6a–6c disclose a sixth embodiment of the present damper and insert including an insert 90 having corrugations 94 and flats 92 spaced circumferentially around insert 90. As shown in FIG. 6c, the flats can be effectively used to create sufficient surface contact with piston body 26 to enhance a connection process, such as resistance welding, soldering or adhesive bonding.

Figure 7:
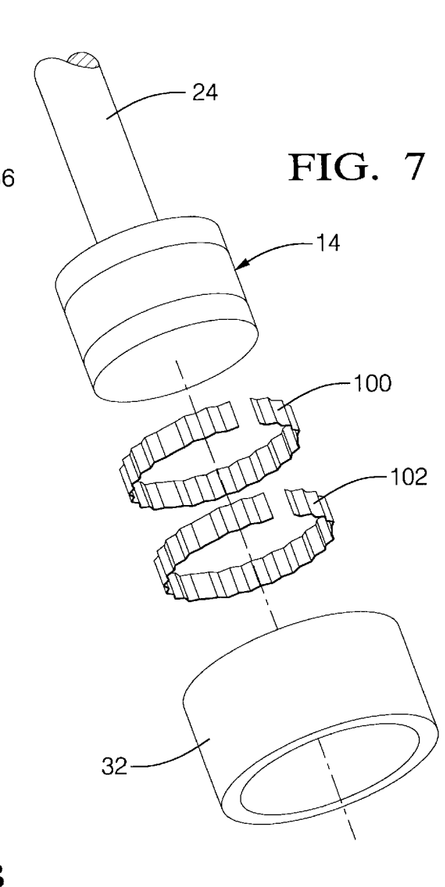
FIG. 7 is an exploded perspective view of a piston assembly containing a seventh embodiment of the insert of the present invention.

FIG. 7 illustrates a seventh embodiment of the present damper and insert including a first insert 100 and a second insert 102 spaced from first insert 100. Both first and second inserts 100 and 102 are formed from two narrow strips and positioned to cover only a respective flux pole 30. As a result, the corrugated inserts 100, 102 do not extend over coil 28. This design decreases the stiffness of the assembly, reduces material use, reduces laminar drag and thus advantageously lowers off-state damping. In addition, this embodiment permits winding of coil 28 after attachment of first and second inserts 100 and 102, respectively.

Figures 8A, 8B, 8C, 8D:
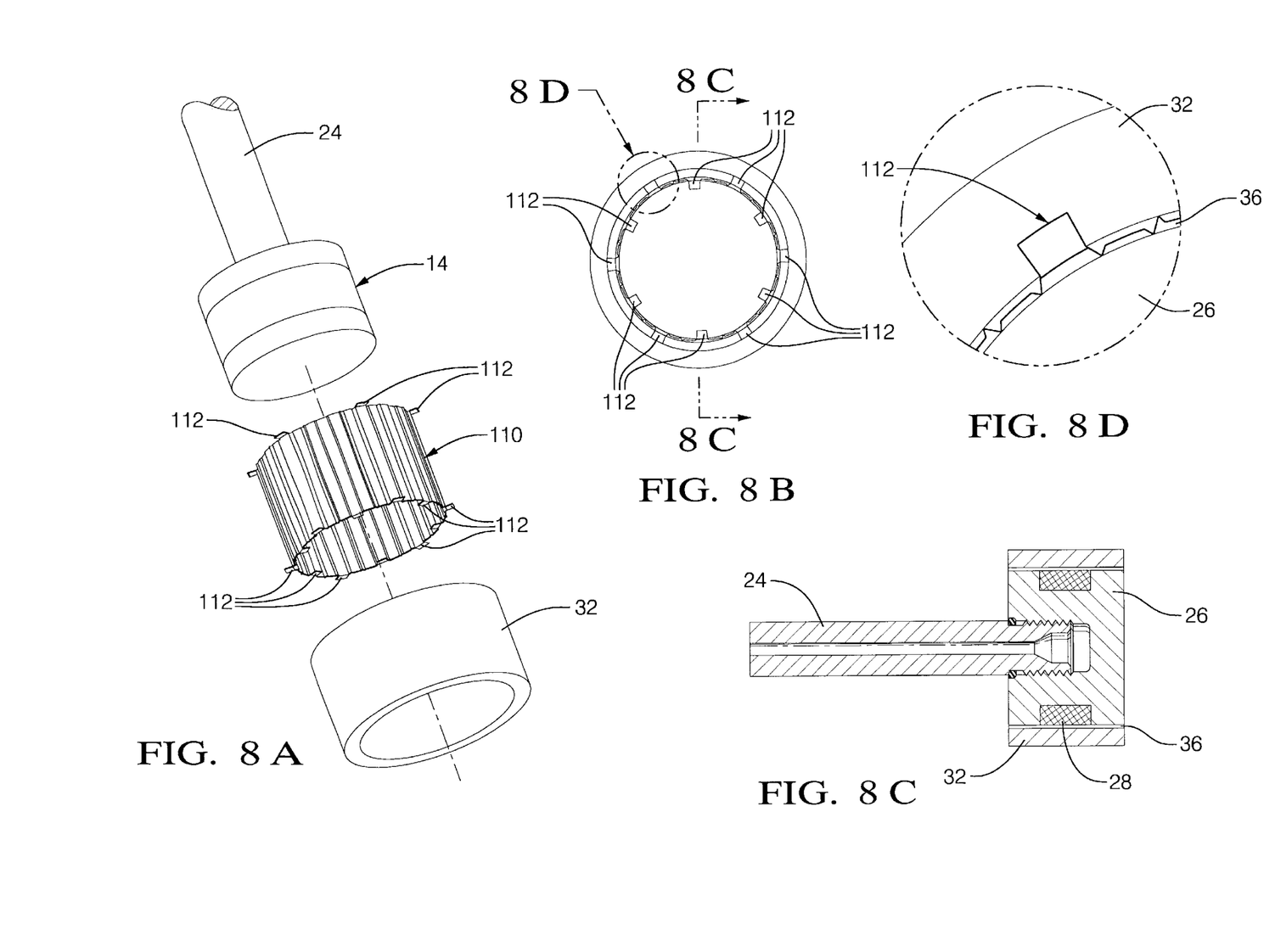

FIGS. 8a–8d illustrate an eighth embodiment of the damper and insert of the present invention including a thin-walled corrugated insert 110 having a series of tabs 112 for aligning insert 110 within flow gap 36 and securely attaching flux ring 32, insert 110 and piston body 26 together. Tabs 112 are positioned at various spaced locations around the circumference of insert 110. Tabs 112 are formed at each end of insert 110 and include both radially inwardly extending tabs for connection to piston body 26 and radially outwardly extending tabs for connection to the end surface of flux ring 32 as shown in FIG. 8b. The tabs may be connected to the piston body 26 and flux ring 32 by, for example, resistance welding.

Therefore, the inserts of the present invention effectively and accurately mount flux ring 32 on piston 14 in a concentric manner and provide sufficient radial and axial support to withstand substantial pressure, inertial and shear forces acting upon the particular inserts and the ring 32. Accordingly, the above-described inserts of the present invention maintain annular flow gap 36 in a simple and cost effective manner without impeding fluid flow through the gap and without interfering with the magnetic flux path across gap 36.

What is claimed is:

1. A damper, comprising:
   a cylinder containing a magnetorheological fluid;
   a piston mounted for reciprocal movement in said cylinder to form a first chamber positioned on one side of said piston and a second chamber positioned on an opposite side of said piston, said piston including a flow gap extending between said first and said second chambers;
   a magnet assembly mounted on said piston to generate a magnetic field extending through said flow gap; and
   at least one thin-walled insert positioned in said flow gap to form a first flow gap section on one side of said thin-walled insert and a second flow gap section on an opposite side of said thin-walled insert,
   wherein said thin-walled insert includes corrugations, is formed of a nonmagnetic material and includes at least a first surface facing said first flow gap section to generate shear stress on the magnetorheological fluid flowing through said first flow gap section and a second surface facing said second flow gap section to generate shear stress on the magnetorheological fluid flowing through said second flow gap section.

2. The damper of claim 1, wherein said corrugations form edges extending axially along said piston, said edges contacting at least one of said piston and said magnet assembly forming said flow gap to radially align said thin-walled insert in said flow gap.

3. The damper of claim 2, wherein said thin-walled insert includes a middle annular corrugated section including said corrugations, a first annular non-corrugated section positioned axially on one side of said middle annular corrugated section and a second annular non-corrugated section positioned axially on an opposite side of said middle annular corrugated section.

4. The damper of claim 2, wherein said thin-walled insert includes a middle annular non-corrugated section, a first annular corrugated section positioned axially on one side of said middle annular non-corrugated section and a second annular corrugated section positioned axially on an opposite side of said middle annular non-corrugated section.

5. The damper of claim 2, wherein said axial edges are fixedly secured to at least one of said piston and said magnet assembly by at least one of a welded joint and a soldered joint.

6. The damper of claim 5, wherein said at least one of a welded joint and a soldered joint is positioned within said flow gap.

7. The damper of claim 1, wherein said magnet assembly includes at least one flux pole piece positioned radially on one side of said flow gap and a flux ring positioned radially on an opposite side of said flow gap, said thin-walled insert being adapted to secure said flux ring and said flux pole piece against relative axial and radial movement.

8. The damper of claim 7, wherein said thin-walled insert includes a plurality of tabs extending outside said flow gap and connected to said flux ring and said flux pole piece.

9. A damper, comprising:

a cylinder containing a magnetorheological fluid;

a piston mounted for reciprocal movement in said cylinder to form a first chamber positioned on one side of said piston and a second chamber positioned on an opposite side of said piston, said piston including a flow gap extending between said first and said second chambers;

a magnet assembly mounted on said piston to generate a magnetic field extending through said flow gap; and at least one corrugated insert positioned in said flow gap to form a first flow gap section on one side of said corrugated insert and a second flow gap section on an opposite side of said corrugated insert, said corrugated insert formed of a nonmagnetic material.

10. The damper of claim 9, wherein said corrugated insert includes corrugations having edges extending axially along said piston.

11. The damper of claim 9, wherein said flow gap extends annularly around an axis of said piston, said corrugated insert having a tubular shape.

12. The damper of claim 9, wherein said corrugated insert includes a middle annular corrugated section including said corrugations, a first annular non-corrugated section positioned axially on one side of said middle annular corrugated section and a second annular non-corrugated section positioned axially on an opposite side of said middle annular corrugated section.

13. The damper of claim 9, wherein said corrugated insert includes a middle annular non-corrugated section, a first annular corrugated section positioned axially on one side of said middle annular non-corrugated section and a second annular corrugated section positioned axially on an opposite side of said middle annular non-corrugated section.

14. The damper of claim 13, wherein said axial edges contact at least one of said piston and said magnet assembly forming said flow gap to radially align said corrugated insert in said flow gap, said axial edges being fixedly secured to said at least one of said piston and said magnet assembly by at least one of a welded joint and a soldered joint.

15. The damper of claim 9, wherein said magnet assembly includes at least one flux pole piece positioned radially on one side of said flow gap and a flux ring positioned radially on an opposite side of said flow gap, said corrugated insert adapted to secure said flux ring and said pole piece against relative axial and radial movement.

16. The damper of claim 15, wherein said corrugated insert includes a plurality of tabs extending outside said flow gap and connected to said flux ring and said pole piece.

17. The damper of claim 9, wherein said at least one corrugated insert includes two such corrugated inserts positioned a spaced axial distance apart within the flow gap.

18. The damper of claim 9, wherein said corrugated insert extends axially substantially through the entire flow gap.

* * * * *